US008689446B2

(12) United States Patent
Cataldo et al.

(10) Patent No.: US 8,689,446 B2
(45) Date of Patent: Apr. 8, 2014

(54) METHOD FOR PRODUCING A WATCH CASE MIDDLE OF REDUCED WEIGHT (75) Inventors: Laurent Cataldo, Divonne (FR); Greg M. Morris, Cincinnati, OH (US); Eli Liechty, Maineville, OH (US)

(73) Assignee: Richemont International S.A., Villars-sur-Glane (CH)

( * ) Notice: Subject to any disclaimer, the term of this patent is extended or adjusted under 35 U.S.C. 154(b) by 460 days.

(21) Appl. No.: 13/019,484

(22) Filed: Feb. 2, 2011

(65) Prior Publication Data
US 2012/0192424 A1 Aug. 2, 2012

(51) Int. Cl.
*G04D 3/00* (2006.01)

(52) U.S. Cl.
USPC ..................... 29/896.33; 29/896.34

(58) Field of Classification Search
USPC ...................... 368/276–317; 29/896.3–896.34
See application file for complete search history.

(56) References Cited

U.S. PATENT DOCUMENTS

| 3,664,119 | A | * | 5/1972 | Besson | 368/35 |
| 4,396,289 | A | * | 8/1983 | Fantone | 356/458 |
| 4,970,708 | A | * | 11/1990 | Gagnebin et al. | 368/300 |
| 4,995,023 | A | * | 2/1991 | Muller et al. | 368/276 |
| 5,493,544 | A | * | 2/1996 | Marthe | 368/281 |
| 6,315,443 | B1 | * | 11/2001 | Meyrat et al. | 368/290 |
| 6,383,248 | B1 | * | 5/2002 | Taylor et al. | 75/247 |
| 7,153,135 | B1 | * | 12/2006 | Thomas | 433/213 |
| 2002/0026982 | A1 | * | 3/2002 | Bredt et al. | 156/284 |
| 2004/0138336 | A1 | * | 7/2004 | Bredt et al. | 523/160 |
| 2004/0155384 | A1 | * | 8/2004 | Sievers et al. | 264/497 |
| 2007/0033805 | A1 | * | 2/2007 | Jonsson et al. | 29/896.41 |
| 2010/0290319 | A1 | * | 11/2010 | Swartz et al. | 368/62 |

FOREIGN PATENT DOCUMENTS

| CH | 664 251 A3 | 2/1988 |
| EP | 0626625 B1 | 11/1994 |
| EP | 1680251 B1 | 11/2007 |
| WO | 2005025783 A1 | 3/2005 |
| WO | 2005025784 A1 | 3/2005 |

OTHER PUBLICATIONS

Shapeways, www.shapeways.com/tutorials/creating-hollow-objects retrieved Aug. 2013 from www.archive.org. Dated Feb. 28, 2009, 2 pages. Title: creating hollow objects.*

(Continued)

*Primary Examiner* — Jacob Cigna
(74) *Attorney, Agent, or Firm* — Young & Thompson (57) ABSTRACT

A method for producing a watch case middle having reduced weight is disclosed. A 3-D data set is generated for the case middle, the model comprising at least one internal cavity within the case middle. The 3-D data set is converted into a plurality of layers, each layer representing a cross-sectional layer of the middle, and then the case middle is formed layer-by-layer from powdered material using an additive manufacturing process such as DMLS in order to provide the case middle with a unitary construction. Loose powder is removed from each cavity via one or more powder evacuation holes formed between the cavity and an external surface of the case middle, and a through hole formed through the middle is machined to a desired finish and/or precision, the through hole being designed to receive a control member stem when a watch movement is mounted inside the middle.

23 Claims, 8 Drawing Sheets

(56) References Cited

OTHER PUBLICATIONS

Sculpteo, www.sculpteo.com/en/help retrieved Aug. 2013 from www.archive.org Dated Feb. 20, 2010, 5 pages. Title: Frequently Asked Questions on the 3D Printing.*

Omega, <http://www.omegawatches.com/spirit/watchmaking/design>, retrived from archive.org, dated Mar. 7, 2010, 3 pages.*

Zedit Pro, Z Corporation, Software Fact Sheet, Retrieved in 2013, Copyright dates to 2008, 2 Pages.*

* cited by examiner

METHOD FOR PRODUCING A WATCH CASE MIDDLE OF REDUCED WEIGHT

FIELD OF INVENTION

The present invention relates to a method for producing a watch case and in particular a watch case middle having reduced weight.

BACKGROUND OF THE INVENTION

A watch case typically comprises four main components: a middle, a crystal, a bezel surrounding the crystal fitted on top of the middle, and a back fitted underneath the middle. The bezel and the middle may in some cases be formed as a single piece, and the middle also typically includes two pairs of projecting lugs that enable the case to be attached to a watch strap or bracelet. The case middle surrounds the watch movement. It is typically made from solid metal material, and the middle is generally the most massive of the watch case components by far.

In order to reduce the amount of material used in a watch case and hence also the weight of the case and the cost of the material used to produce it (particularly in the case of precious metals), it has been proposed to hollow out the middle. For example, EP626625 describes a precious metal watch case in which the middle is formed by fitting a central cylindrical part and an annular peripheral part together so that an annular cavity exists between the two. In order to improve the strength of the middle, a support frame in a non-precious metal is placed within the cavity.

Similarly, in CH664251, a unitary bezel-middle having its inner wall hollowed-out is fitted together with and fixes in place a separate L-shaped encasing piece that itself holds the watch movement. A hollow cavity exists between the bezel-middle and the encasing piece.

Unfortunately, such prior art solutions for producing hollowed-out watch case middles generally result in watch cases that are of significantly reduced strength and that require complex assembly. In addition, because the middle is not unitarily formed, the watch case may suffer from reduced sealing or watertightness compared to a conventional watch case. Furthermore, where a massive middle is initially produced and then subsequently hollowed-out, there may be a significant amount of material wasted that cannot be readily reused.

There is consequently a need to provide a reduced weight watch case and in particular a watch case middle for which the above-mentioned shortcomings are alleviated.

BRIEF SUMMARY OF THE DISCLOSURE

The present invention addresses the above-described disadvantages of the prior art by providing a method for producing a watch case middle having reduced weight in which a 3-D data set is generated for the case middle, the model comprising at least one internal cavity within the case middle. The 3-D data set is converted into a plurality of layers, each layer representing a cross-sectional layer of the middle, and then the case middle is formed layer-by-layer from powdered material using an additive manufacturing process such as DMLS in order to provide the case middle with a unitary construction. Loose powder is removed from each cavity via one or more powder evacuation holes formed between the cavity and an external surface of the case middle, and a through hole formed through the middle is machined to a desired finish and/or precision, the through hole being designed to receive a control member stem when a watch movement is mounted inside the middle.

The present invention further provides a watch case middle comprising an outer peripheral surface and an inner peripheral surface defining an opening for housing a watch movement, in which the case middle comprises at least one internal cavity that extends around the case middle between the inner and outer peripheral surfaces such that the case middle comprises at least 25% less material than a solid case middle having the same external geometry but no internal cavities. The case middle is formed layer-by-layer from powdered material using an additive manufacturing process such that the case middle has a unitary construction throughout.

These and other embodiments and variations are described further below.

BRIEF DESCRIPTION OF THE DRAWINGS

The objects and advantages of the present invention will be better understood and more readily apparent when considered in conjunction with the following detailed description and accompanying drawings which illustrate, by way of example, preferred embodiments of the invention and in which.

DETAILED DESCRIPTION OF PREFERRED EMBODIMENTS

Figure 1:
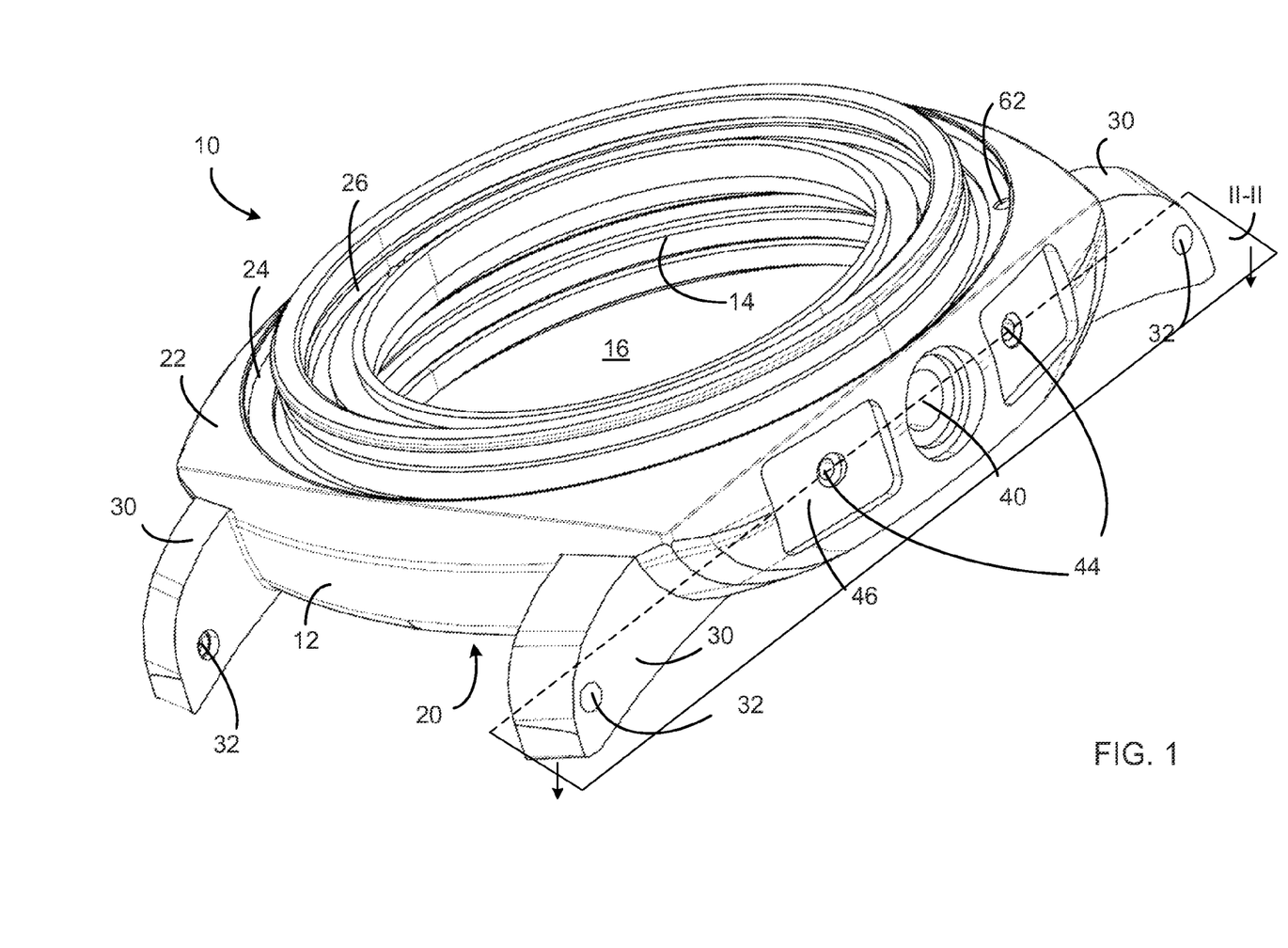
FIG. 1 is a perspective view of a watch case middle produced in accordance with the method of the present invention.

FIG. 1 is a perspective view of an exemplary watch case middle 10 produced in accordance with the method of the present invention. Middle 10 has an outer peripheral surface 12, which in this example has four slightly rounded sides, and an inner peripheral surface 14 defining a generally cylindrical-shaped opening 16 in which a watch movement (not shown) can be housed. In known manner, the profile of inner peripheral surface 14 includes a series of projections and grooves for securely holding the watch movement cage. Middle 12 further has a bottom surface 20 onto which a watch case back (not shown) can be fitted, and a top surface 22. Top surface 22 includes profiled surface areas 22 and 24 that include a series of channels and flange-like projections. The latter are designed to receive and fit a bezel and a glass crystal in conventional manner; again neither the bezel nor the crystal is shown in the drawings. Sealing joints such as O-rings are generally interposed between the middle 10 and each of the other components of the watch case during assembly.

Case middle 10 further includes two pairs of projecting lugs 30, with each pair being destined to receive an end of a watch strap or bracelet. Each lug 30 has a hole 32 for fixing the end of the bracelet to the lugs by any suitable manner, for example using a bar and screws. It will however be appreciated that in some bracelet-fastening systems, no holes are needed to secure a bracelet to a watch case.

On one side of outer surface 12, a through hole 40 for receiving the stem of a watch control member notably a setting crown (not shown) extends through the middle 10 into cavity 16. A similar through hole 42 (FIG. 2) extends through the middle and is designed to receive the stem of a pusher button (not shown). In the illustrated example of FIG. 1, the surface 12 also includes two indentations 46, on each side of through hole 40, for receiving the feet of a crown-covering bridge (not shown) such as the well-known bridge used in Panerai Luminor® watches. Within the indentations 46, blind threaded holes 44 are formed to receive screws that will fix the crown-covering bridge to case middle 10 after the crown control member has been mounted.

Case middle 10, though formed in a unitary manner, has at least one internal cavity 50 formed within it. As noted above, depending on the size of the cavity or cavities, the weight of the case middle and the amount of material it contains can be greatly reduced. Preferably case middle 10 comprises at least 25% less material (and hence weighs at least 25% less) than a solid middle having the same external geometry but no internal cavities. More preferably, the reduction in weight and amount of material used for the middle is at least 40%. As described in more detail below in connection with FIG. 8, this reduction is achieved by building the case middle 10, using an additive manufacturing process in which an energy source is used to unify, i.e., solidify or bond, layers of powdered material to one on top of another.

While the method of the present invention is particularly applicable to watch cases made from metals and alloys thereof, it may also be used to produce watch cases from any powdered material (for example powders for ceramics or elastomers) that can be fused, melted or otherwise united together by way of an additive manufacturing process. The method is especially advantageous for producing cases made of metals that are relatively heavy (such as stainless steel) and/or expensive (such as gold and platinum). Other watch case powdered materials such as Cobalt Chromium and Titanium alloys may also be used.

Figure 2:
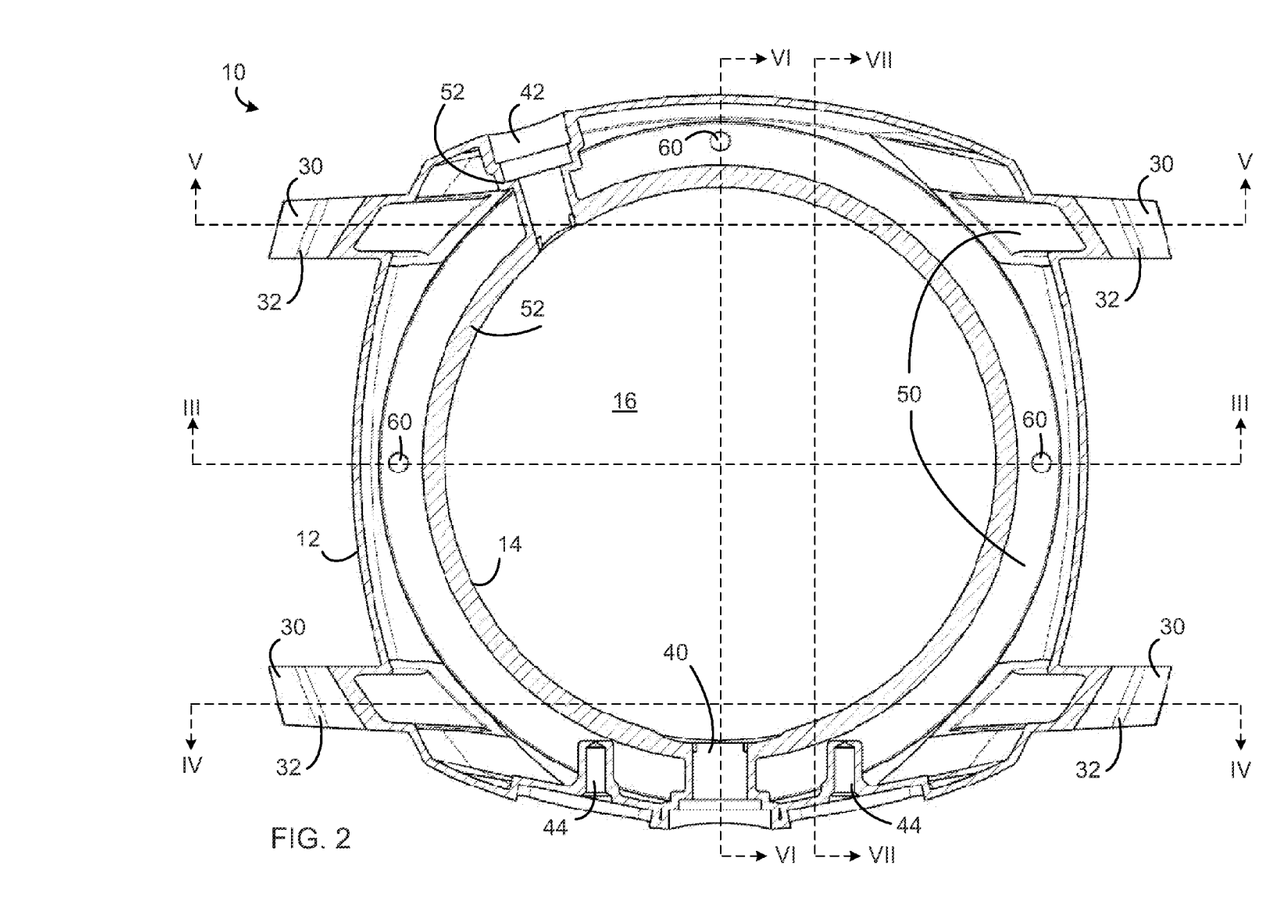
FIG. 2 is a perspective section view taken along the plane II-II in FIG. 1 looking downward toward the back of the case middle in one embodiment.
Figure 3:
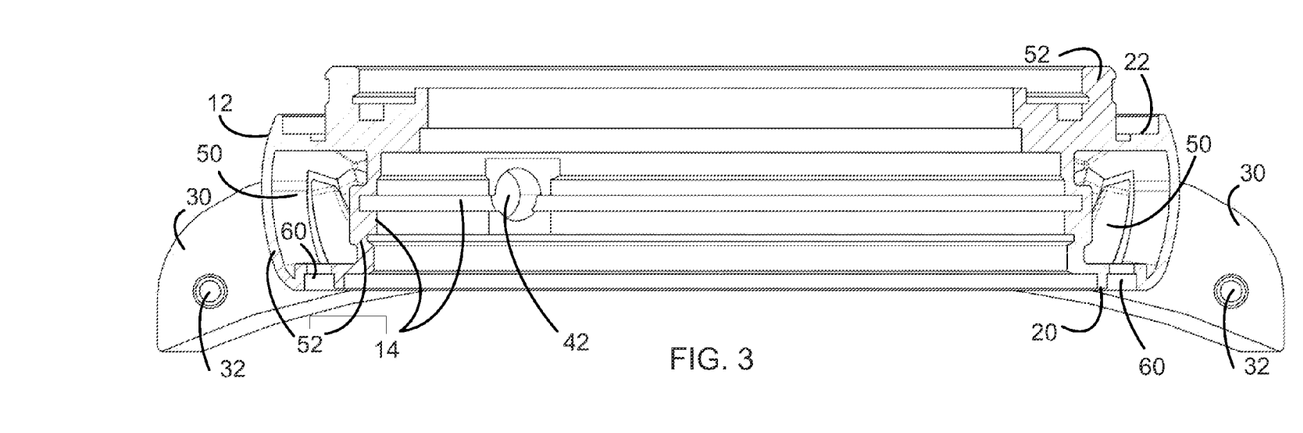
FIG. 3 is a perspective section view taken along the line III-III in FIG. 2.
Figure 4:
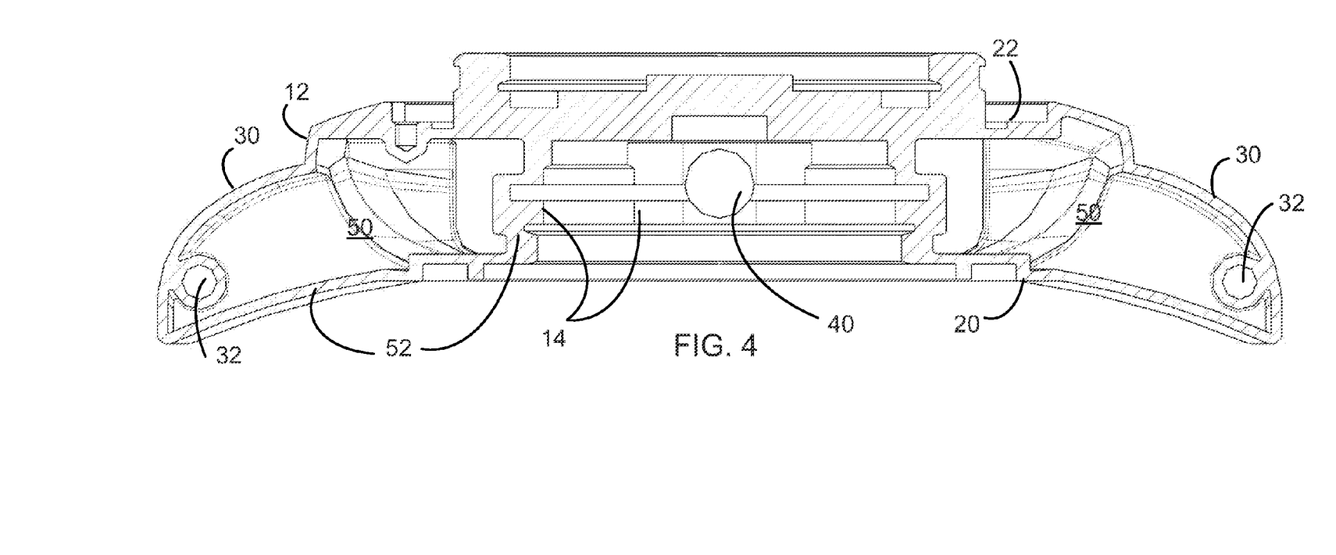
FIG. 4 is a perspective section view taken along the line IV-IV in FIG. 2.
Figure 5:
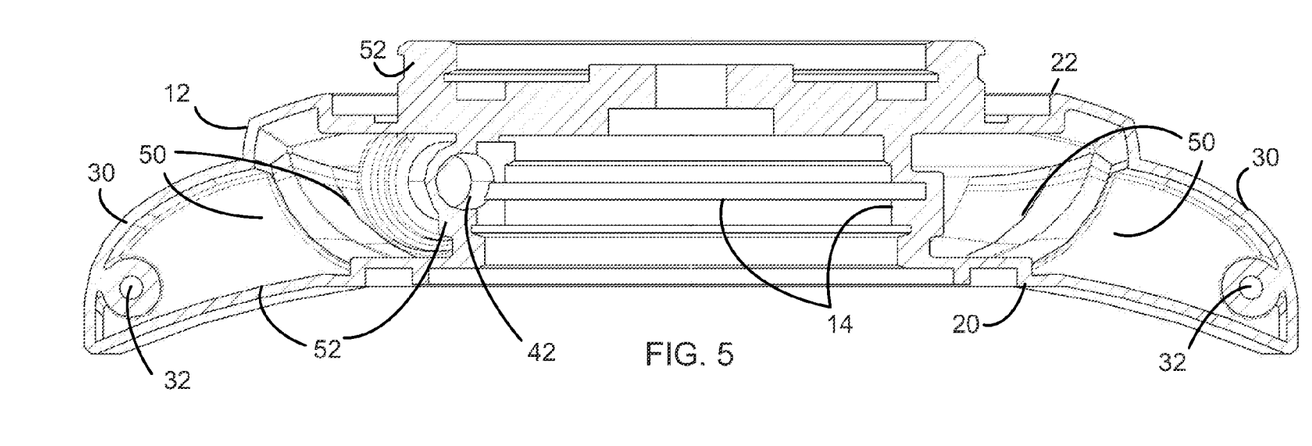
FIG. 5 is a perspective section view taken along the line V-V in FIG. 2.
Figure 6:
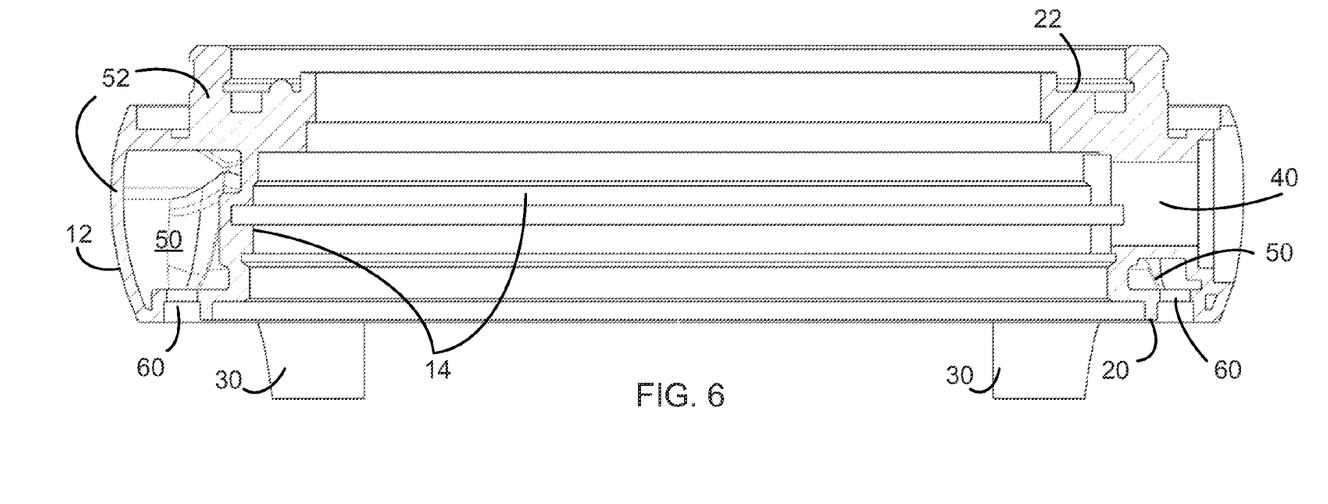
FIG. 6 is a perspective section view taken along the line VI-VI in FIG. 2.
Figure 7:
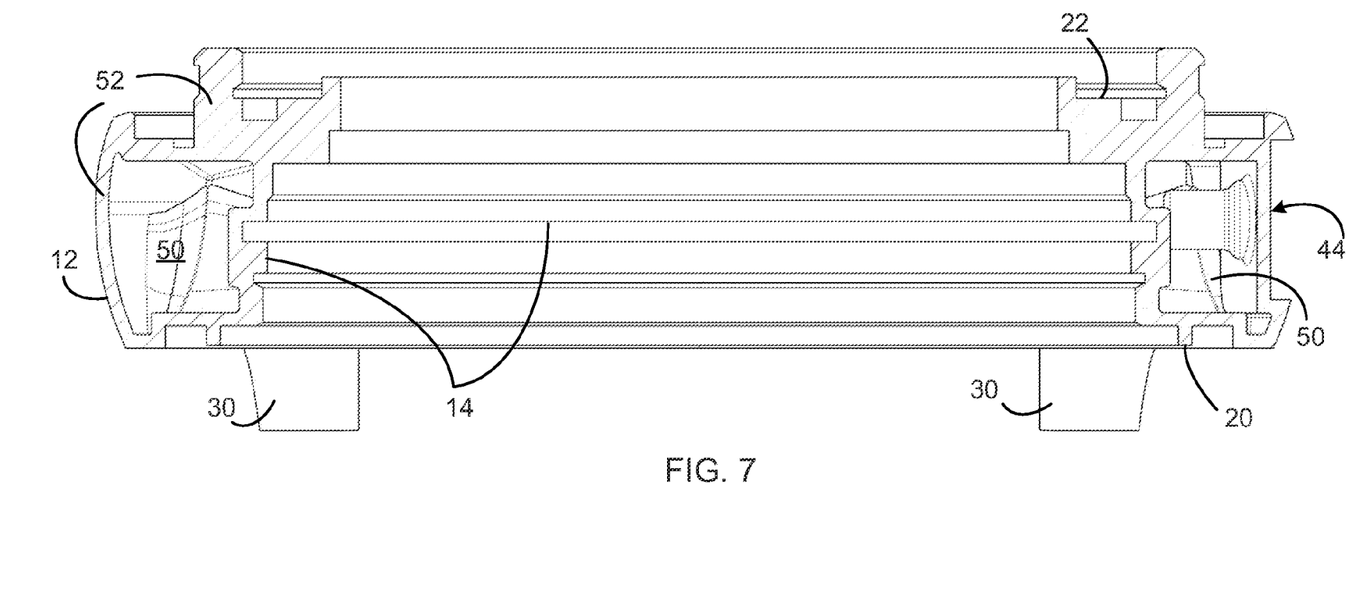
FIG. 7 is a perspective section view taken along the line VII-VII in FIG. 2.

FIGS. 2-7 illustrate the internal geometry of case middle 10. More particularly, FIG. 2 is a perspective section view taken along the plane II-II in FIG. 1 looking downward toward the back side 2- of the case middle according to one embodiment. FIGS. 3-7 are perspective section views taken respectively along the lines III-III, IV-IV, V-V, VI-VI, and VII-VII in FIG. 2. As shown, middle 10 is formed throughout by walls 52 that have been unitarily formed, layer by layer, from one or more desired powdered materials. Walls 52 define at least one internal cavity while also surrounding holes 40, 42, 44 and 32 that are formed through or within the case middle. (It should be noted that although the location of bracelet fixation through holes 32 is shown for clarity in FIG. 2, they do not lie in the section plane II-II.)

In the illustrated embodiment, case middle 10 comprises a single contiguous internal cavity 50 that generally extends circularly around the middle between surfaces 12 and 14 as well as into lugs 30. The internal shape and geometry of the cavity can vary depending on the external profile of the case middle and the thickness of walls 52. The latter depends, in turn, partly on the type of powder material used and the strength of the resulting unified material. For each cavity, at least one powder evacuation hole 60, 62 is also formed in order to enable excess or loose powder to be removed from the cavity after the building of the layers is complete. In the illustrated embodiment, three such powder evacuation holes 60 are formed between the bottom surface 20 of middle 10 (which receives the watch case back) and the cavity 50. A further powder evacuation hole 62 (FIG. 1) is formed between the top surface 22 of middle 10 (more particularly the area 24 of surface 22 that receives the bezel) and the cavity 50. The purpose and role of holes 60, 62 are described further below.

Figure 8:
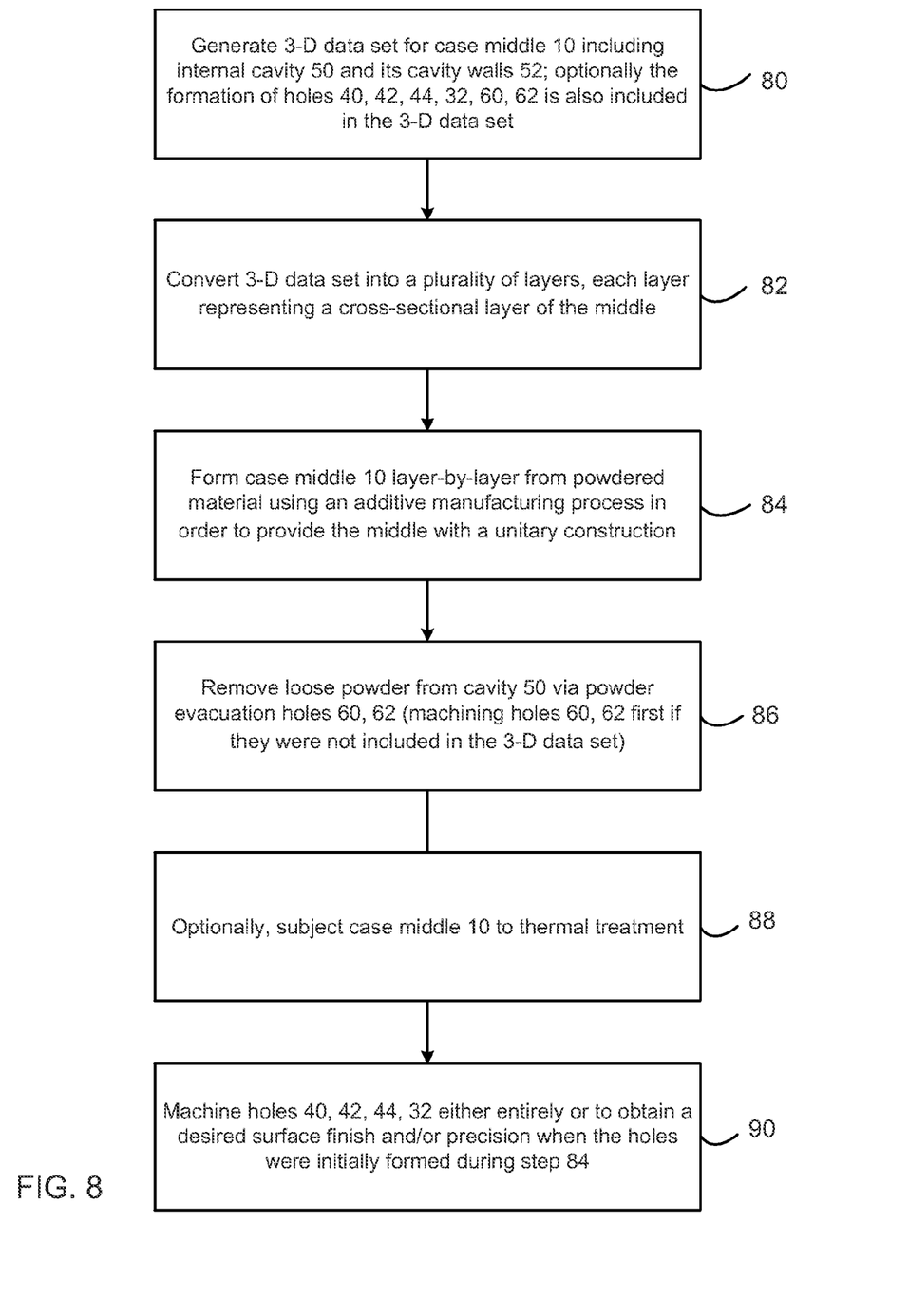
FIG. 8 is a flow diagram illustrating a method for producing a watch case middle in accordance with an embodiment of the invention.

Referring now to the flow diagram of FIG. 8, a method for producing a watch case middle in accordance with a preferred embodiment of the invention is now described. At a first step 80, a three-dimensional (3-D) data set of the watch case middle 10 is generated based on its desired physical parameters, in particular the shapes and sizes of the surfaces 12, 14, 20, and 22 and the location of holes 40, 42, 44 and 32. As is well known, 3-D computer-aided-design (CAD) data models can be generated using programs such as SolidWorks®. In other cases, a data modeling tool specific to the additive manufacturing process and/or machine being used to form case middle 10 may be used. Such a tool may notably convert a CAD data model to a data set format suitable for use by the additive manufacturing machine. Whatever the form, the 3-D data set for watch middle 10 notably models the configuration of internal cavity 50, including the material that forming the cavity walls 52 that surround control member stem through holes 40 and 42, screw holes 44, and bracelet fixation holes 32. Where the middle includes several non-contiguous internal cavities, the cavity walls separating each of these are also included in the model.

Optionally, the 3-D data set may include from the outset the formation of holes 40, 42, 44 and 32; in this case, as described further below, these holes are designed in the data model to have slightly smaller dimensions than what is finally desired. Alternatively, the 3-D data set can include thicker solid cavity wall portions 52 that extend throughout the entire region of the middle in which holes 40, 42, 44 and 32 are to be formed, and those holes are then formed entirely during a subsequent machining step, after to the layer-by-layer building of middle 10. In a similar manner, powder evacuation holes 60 and 62 may be formed initially as part of the 3-D data set information (e.g., by modifying a CAD data model to account for them), or they may alternatively be formed as part of a post-machining step.

Figure 9:
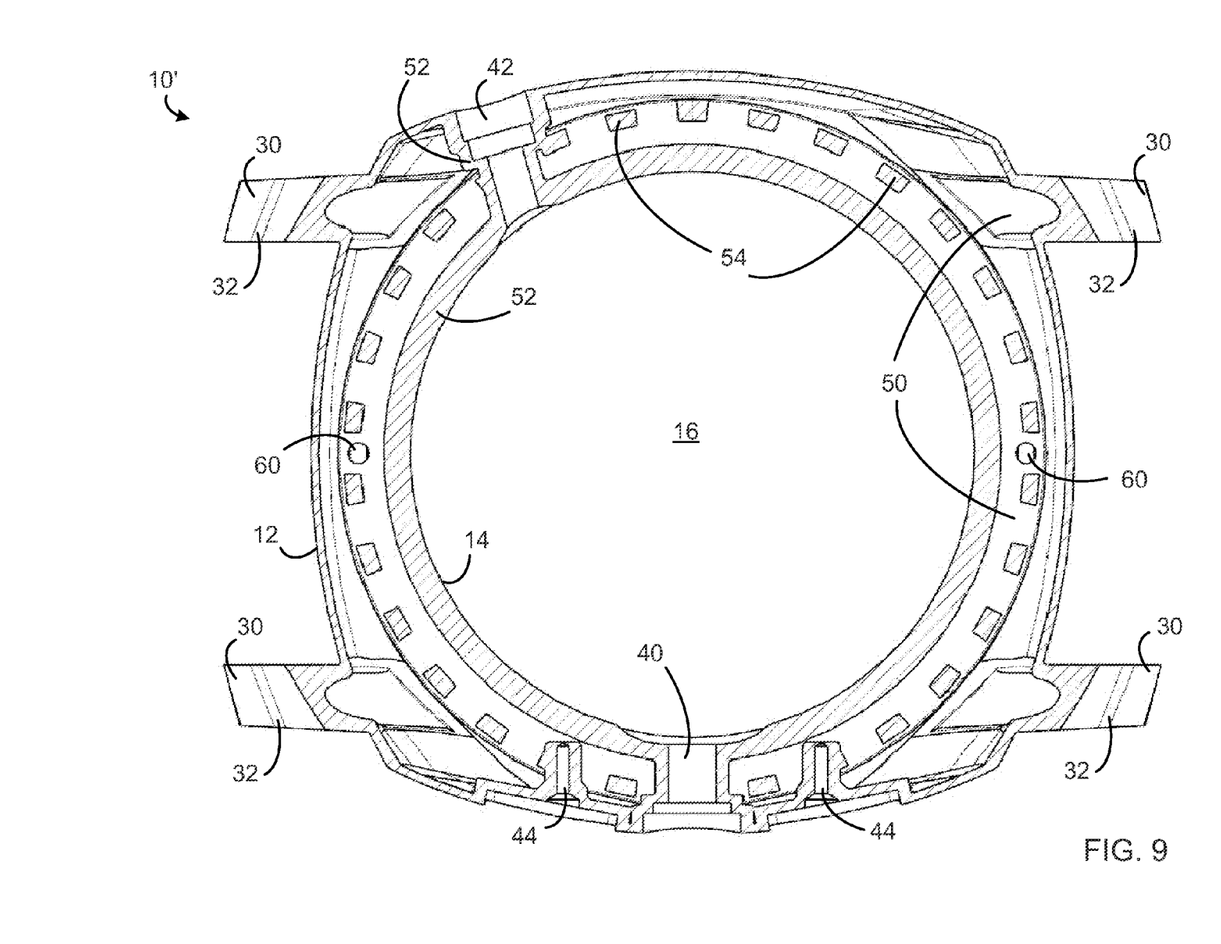
FIG. 9 is a perspective section view taken along the plane II-II in FIG. 1 looking downward toward the back of the case middle in another embodiment.

In an alternative embodiment of a case middle 10' illustrated in FIG. 9, the cavity 50 may further include a support structures 54 in order to strengthen case middle 10. FIG. 9 is a perspective section view taken along the plane II-II in FIG. 1, and apart from the presence of support structures 54, case middle 10' of FIG. 9 is essentially identical to case middle 10 of FIG. 2. In the example of FIG. 9, the support structures 54 are pillar-like elements disposed throughout cavity 50, each extending from the bottom of case middle to the top. In general, however, support structures may be arranged and may extend in any structurally appropriate manner. For example, internal cavity support structures may have a grid-like arrangement or they may extend in parallel to the plane II-II similar to beams. Support structures may especially be desirable where the cavity walls 52 are designed to be very thin. Where support structures 54 are built within the cavity of the case middle, they are included in the 3-D data set at step 80.

It will be appreciated that the additive manufacturing machine or a related tool may, for example, automatically determine the location, size, and geometry for the support structures 54 and/or powder evacuation holes 60, 62 based on a set of criteria or instruction input by a user. In this case, the additive manufacturing machine or tool can automatically supplement and modify the initial user-specified data for the middle to generate a final 3-D data set to be used in the additive manufacturing process as described below. More generally, the generation of a 3-D data set that includes all of the above described features in a manner that optimizes both weight reduction and structural integrity generally depends on a number of factors including the shape of the case middle and its various parts, the type of powder material used and the strength of the resulting unitary material. At the same time, the flexibility of additive manufacturing processes enables any specific area of the case middle geometry to be reinforced without changing the middle's overall design. For example, if it is determined that there is a weak areas in a specific section of a wall, that section of the wall can be made thicker or an appropriate support structure can be readily added in.

Once the 3-D data set for middle 10 is fully generated, it is converted at step 82 into a plurality of layers, each layer representing a cross-sectional layer of the middle. These layers will be formed one onto the other using an additive manufacturing machine and process described below, and the conversion is typically carried out by the additive manufacturing machine or a related software tool thereof. Preferably, this conversion occurs so that the layers run in parallel manner along an axis perpendicular to the face of the watch (i.e., to plane II-II), extending from the bottom surface 20 to the top surface 22. The layers preferably have a thickness in the range 1-100 μm, and they may be of equal thickness or different thicknesses. For example, for a watch case middle having a height of approximately 1 cm, and using a uniform layer thickness of 20 μm, the 3-D data set would be converted into around 500 layers.

As shown at step 84, case middle 10 is formed layer-by-layer using an additive manufacturing process (also sometime called a rapid manufacturing process). In this type of process, an energy source such as a laser or an electron beam is used to unite (i.e., to solidify, fuse or bond) layers of powdered material together. For example, laser-based additive manufacturing is accomplished by directing a high power laser at a substrate or platform to create a melt pool. In particular, the direct metal laser sintering (DMLS) process, which was developed by EOS GmbH in Germany and is designed to sinter or fuse pre-alloyed powdered metals, is particularly suitable for producing metal watch case middles in accordance with the present invention. In DMLS, each layer is formed by depositing a uniformly thick layer of powdered material across an entire build area. The powder in specific areas is then selectively melted by the laser so that those areas fuse to the immediately preceding layer of fused material (that is present in solid form underneath the powder layer). Additional information on additive manufacturing is found in the "Wohlers Report 2010—Additive Manufacturing State of the Industry", Annual Worldwide Progress Report, Terry Wohlers, ISBN 0-9754429-6-1, the contents of which are incorporated herein by reference.

Figure 10:
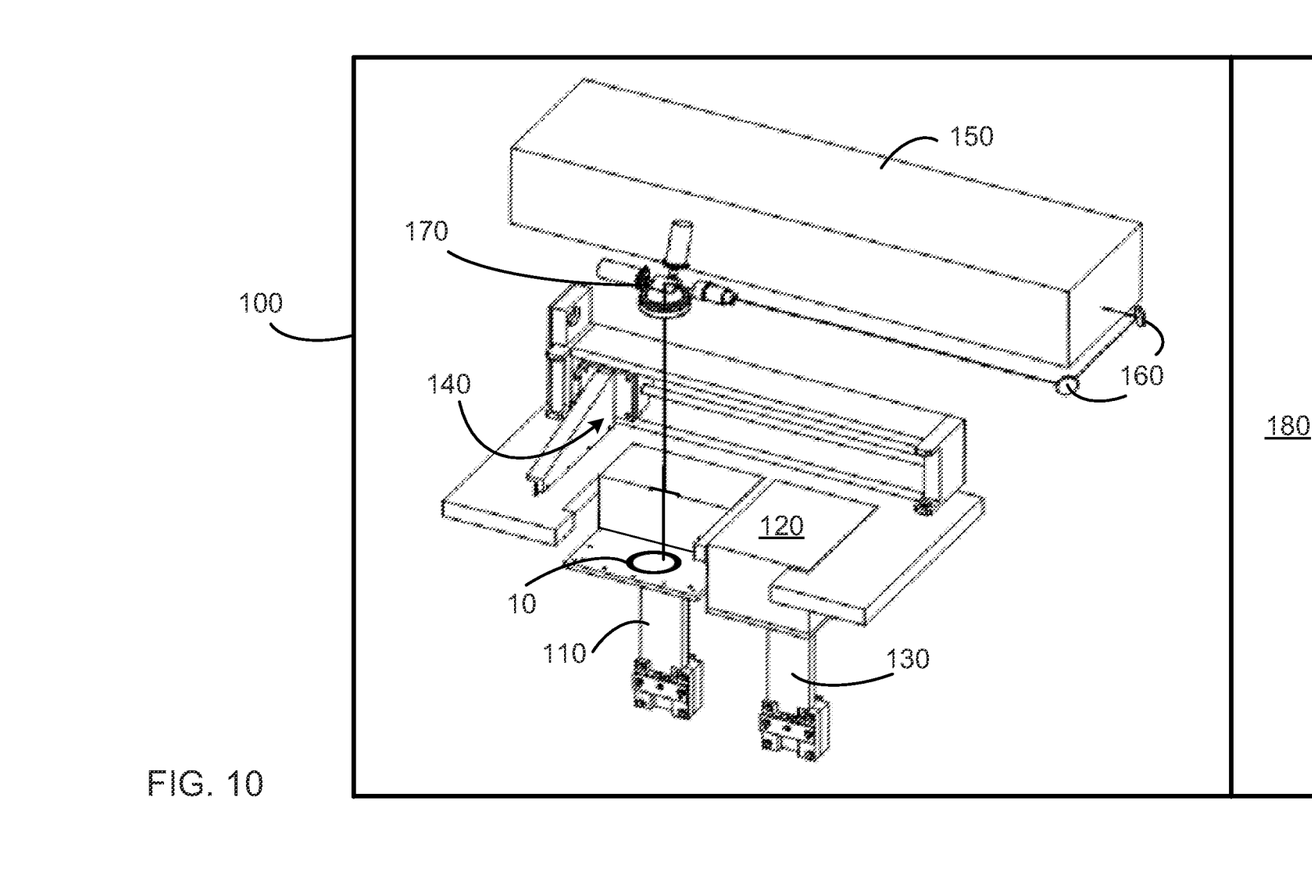
FIG. 10 is a diagram of an exemplary additive manufacturing machine suitable for use in the method of FIG. 8.

FIG. 10 is a diagram illustrating the main parts of a DMLS machine 100, such as the EOSINT M270 machine from EOS GmbH, suitable for building case middle 10. As shown, machine 100 includes a building platform 110 onto which the case middle is manufactured. Platform 110 can be successively lowered as the fusing of powder to produce each layer is completed. In this manner, the building of each layer occurs at the same vertical position within machine 100. A powder reservoir 120 cooperates with a dispenser platform 130 and a recoating system 140 to evenly dispense metal powder during the building/processing of each layer. The energy source module includes a laser 150, a series of mirrors 160, and a galvanometer-scanner with f-Theta lens 170 and is precisely controlled in response to the final 3-D data set that is used by the machine's control system 180.

More generally however, while a DMLS machine 100 is shown, any suitable additive manufacturing process that directs an energy source to unite, i.e., solidify or bond, layers of powdered material together to provide a unitary case middle construction may be used. For example, case middle 10 may also be built using an electron beam melting (EBM) or an ultrasonic consolidation (UC) additive manufacturing process.

If powder evacuation holes 60 and 62 were included in the final 3-D data set and therefore were formed during additive manufacturing at step 84, then, at step 86, loose powder remaining in each cavity is removed via the one or more powder evacuation holes 60, 62 formed between that cavity and an external surface of the middle. This may be accomplished in different manners; for example by using suction or by blowing into a first powder evacuation hole so that powder exits from a second powder evacuation hole. On the other hand, if the powder evacuation holes were not included in the 3-D data set, then they may be formed by a machining step once the additive manufacturing at step 84 is complete.

It will be appreciated that the powder evacuation holes are preferably in locations that will subsequently be covered and sealed by other components of the watch case, e.g., on an area of surface 20 that will be covered by the watch back and/or an area of surface 22 that will receive the bezel. Holes 60, 62 may also be subsequently filled in after removing powder in order to eliminate the possibility of any remaining loose powder interfering with the watch mechanisms and/or to prevent the powder from possibly affecting the robustness of the case middle. Holes 60, 62 may be filled by, for example, welding the hole shut. However, even when filled, it is preferred that the powder evacuation hole sites remain hidden when the watch case is finally assembled.

At step 88, a thermal treatment step is next preferably carried out on the case middle. The duration and temperature of the thermal treatment may vary depending on the nature of the powdered material. This step may provide stress relief within the case middle structure as well as other potential structural benefits. However, stress relief may not be necessary in some instances or it may be achieved by alternative means, for instance using vibratory stress relief. Case middle 10 may also at this stage be separated, e.g. mechanically, from the platform 110 of machine 10. However, separation could alternatively occur prior to the loose powder removal step or at a later stage.

Subsequently, at step 90, holes 40, 42, 44, and 32 are machined to obtain a desired surface finish and/or precision throughout the holes. As indicated above, holes 40, 42, 44, and 32 may be completely formed using conventional machining tools at this step 90, in which case the 3-D data set includes thick cavity wall portions 52 that extend throughout the entire region of the middle in which holes 40, 42, 44 and 32 are to be formed. Alternatively, the 3-D data set may include an initial pre-form of holes 40, 42, 44 and 32, but where they are designed to have slightly smaller dimensions than those that are ultimately necessary in the final case middle 10. In this case, the machining step at 90 is still carried out to arrive at the desired surface finish and/or precision throughout holes 40, 42, 44 and 32. The former option may be preferred especially when hard materials are used, since drilling or milling through an already existing hole (as opposed to solid material) may cause tools to fail prematurely. With respect to the latter option, although it is envisaged that in the future additive manufacturing processes will enable the thickness of the layers to be reduced and hence for a better overall precision of the features of case middle to be achieved, it is believed that the ability of the additive manufacturing process to finely control surface finish (i.e., roughness) and/or surface roundness will remain inferior to what can be achieved using machining tools.

Additional precision machining steps are also preferably carried out on the areas of surfaces 20 and 22 destined to receive the back and the bezel of the watch case. Lastly, a final step of finishing (e.g., polishing) the external surface of the middle—or at least that part that will remain visible once the watch is fully assembled—is carried out prior to assembling the watch case.

In this manner, a watch case middle produced by the method of the present invention continues to have a strong, resilient and unitary construction despite using less material and having a significantly reduced weight. In known manner, the middle can subsequently be used with a case back, bezel and crystal to assemble a watch case that houses a watch movement. As a further advantage, the method of the present invention greatly facilitates the construction of watch case middles having varied and complex geometries. Moreover, the method may also be adapted to produce other light-weight external watch components; in particular bracelet links that are conventionally made of solid metal but that could instead be produced with an internal cavity using an additive manufacturing process.

While the invention has been described in conjunction with specific embodiments, it is evident that numerous alternatives, modifications, and variations will be apparent to those skilled in the art in light of the foregoing description.

The invention claimed is:

1. A method for producing a watch case middle having reduced weight, comprising:
   generating a 3-D data set as a model of the case middle, the model comprising at least one internal cavity within the case middle;
   converting the 3-D data set into a plurality of layers, each layer representing a cross-sectional layer of the middle;
   forming the case middle layer-by-layer from powdered material using an additive manufacturing process in order to provide the case middle with a unitary construction, including forming the at least one internal cavity;
   removing loose powder from each cavity via one or more powder evacuation holes formed between the cavity and an external surface of the case middle; and
   machining a through hole formed through the case middle to a desired finish and/or precision, the through hole being designed to receive a control member stem when a watch movement is mounted inside the case middle,
   wherein, in a completed watch, the case middle comprises the at least one internal cavity.

2. The method according to claim 1, wherein the case middle comprises at least 25% less material than a solid middle having the same external geometry but no internal cavities.

3. The method according to claim 1, wherein the 3-D data set includes an initial pre-formation of the through hole for receiving the control member stem, the dimensions of the pre-formed through hole in the 3-D data set being smaller than the final dimensions of the through hole, the 3-D data set further including the formation of walls surrounding the through hole.

4. The method according to claim 1, wherein the 3-D data set includes solid cavity wall portions that extend throughout the entire region of the middle in which the through hole for receiving the control member stem is to be formed, and the through hole is formed entirely during the step of machining the through hole.

5. The method according to claim 1, wherein the 3-D data set includes a plurality of internal cavities within the case middle and walls separating those cavities.

6. The method according to claim 1, wherein the 3-D data set further includes support structures located within the at least one internal cavity for strengthening the case middle.

7. The method according to claim 1, wherein the 3-D data set includes the formation of the one or more powder evacuation holes.

8. The method according to claim 1, wherein,
   the at least one cavity is formed totally within and surrounded by sintered material, and
   the one or more powder evacuation holes are formed by machining said holes, through said sintered material, after the case middle has been formed.

9. The method according to claim 1, wherein the one or more powder evacuation holes are located in sites that remain hidden from view when the case middle forms part of a fully assembled watch case.

10. The method according to claim 1, further comprising, after the step of removing loose powder, filling in the one or more powder evacuation holes.

11. The method according to claim 1, wherein the layers have a thickness in the range 1-100 μm.

12. The method according to claim 1, wherein the additive manufacturing process comprises direct metal laser sintering.

13. The method according to claim 1, wherein the additive manufacturing process comprises an electron beam melting additive manufacturing process.

14. The method according to claim 1, further comprising machining areas of a bottom surface and a top surface of the case middle that are respectively destined to receive a case back and a bezel of a watch case.

15. The method according to claim 1, further comprising finishing the external surface of the case middle.

16. The method according to claim 1, further comprising subjecting the case middle to thermal treatment after removing loose powder from each cavity and before machining the through hole to a desired finish and/or precision.

17. The method according to claim 1, wherein the case middle is formed layer-by-layer on a platform, and the method further comprises separating the case middle from the platform after the case middle has been formed.

18. The method according to claim 1, wherein the case middle has an outer peripheral surface and an inner peripheral surface defining a generally cylindrical-shaped opening for housing the watch movement, and the at least one internal cavity extend or extends circularly around the middle between the inner and outer peripheral surfaces.

19. The method according to claim 18, wherein the case middle further includes two pairs lugs of projecting from the outer peripheral surface, each pair of lugs being destined to receive an end of a watch strap or bracelet, and the at least one internal cavity further extending into the lugs.

20. A method for producing a watch case middle having reduced weight, comprising:
   generating a 3-D data set as a model of the case middle, the model comprising at least one internal cavity within the case middle and solid cavity wall portions that extend throughout the entire region of the middle in which a through hole is to be formed, the through hole being designed to receive a control member stem when a watch movement is mounted inside the middle, converting the 3-D data set into a plurality of layers, each layer representing a cross-sectional layer of the middle;

forming the case middle layer-by-layer from powdered material using an additive manufacturing process in order to provide the case middle with a unitary construction;

removing loose powder from each cavity via one or more powder evacuation holes formed between the cavity and an external surface of the case middle; and machining the through hole through the solid cavity wall portions formed, wherein, in a completed watch, the case middle comprises the at least one internal cavity.

21. The method according to claim 20, wherein, said step of forming the case comprises forming the at least one cavity totally within and surrounded by sintered material, and said step of removing loose powder comprises formed, by machining the one or more powder evacuation holes are formed by machining through said sintered material, said evacuation holes.

22. A method for producing a watch case middle having reduced weight, comprising:

generating a 3-D data set as a model of the case middle, the model comprising at least one internal cavity within the case middle and the formation of one or more powder evacuation holes between each cavity and an external surface of the case middle, the powder evacuation holes being located in sites that remain hidden from view when the case middle forms part of a fully assembled watch case;

converting the 3-D data set into a plurality of layers, each layer representing a cross-sectional layer of the middle;

forming the case middle layer-by-layer from powdered material using an additive manufacturing process in order to provide the case middle with a unitary construction;

removing loose powder from each cavity via the one or more powder evacuation holes; and machining the through hole through the solid cavity wall portions formed, wherein, in a completed watch, the case middle comprises the at least one internal cavity.

23. The method according to claim 22, wherein, said step of forming the case comprises forming the at least one cavity totally within and surrounded by sintered material, and said step of removing loose powder comprises formed, by machining the one or more powder evacuation holes are formed by machining through said sintered material, said evacuation holes.

\* \* \* \* \*